Nov. 25, 1952  M. V. CHURCHILL  2,619,000
CONVEYER BELT FOR CARTRIDGE BELTING MACHINES
Filed Oct. 3, 1949  2 SHEETS—SHEET 1
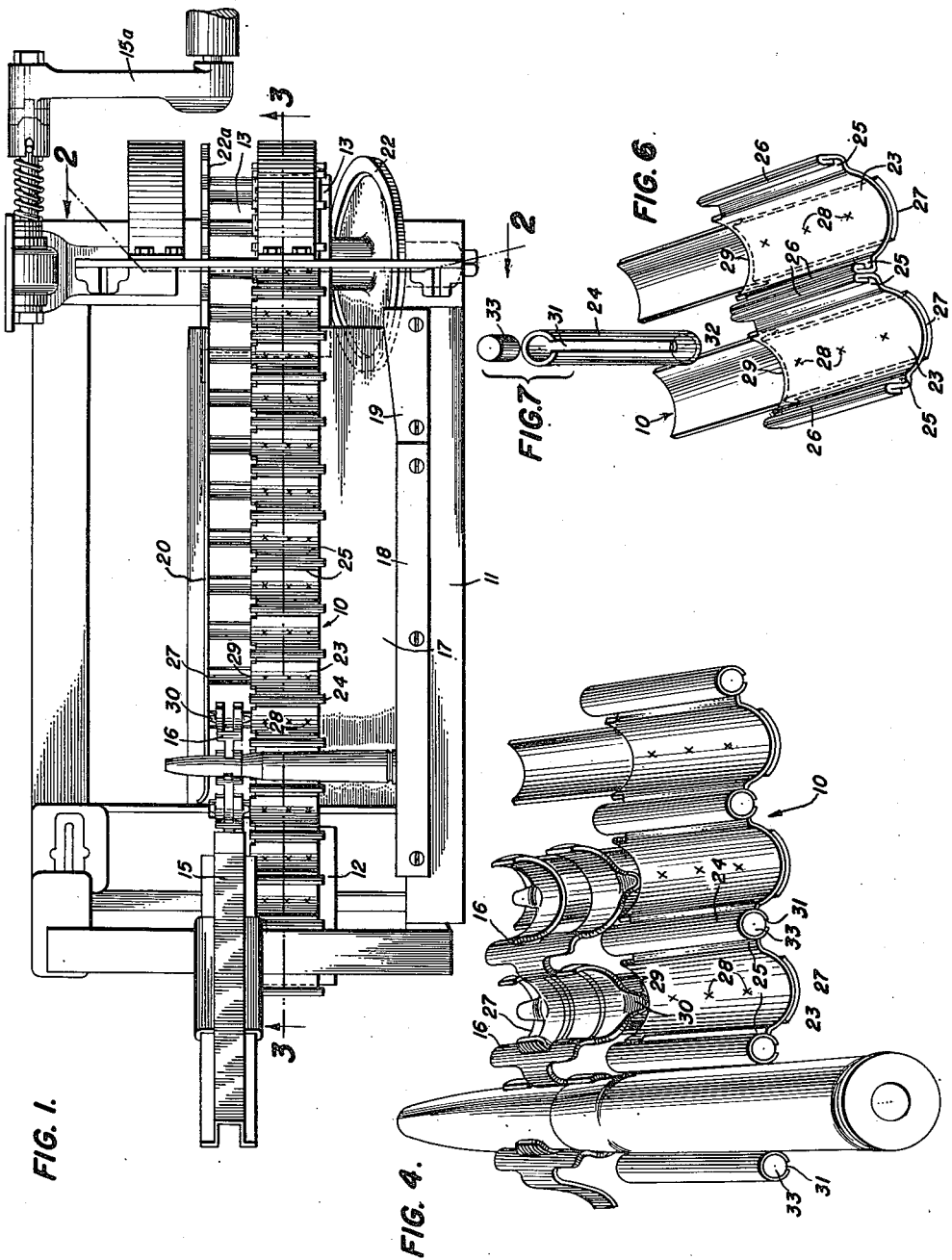
INVENTOR
MURRAY V. CHURCHILL
BY
ATTORNEYS Nov. 25, 1952     M. V. CHURCHILL     2,619,000
CONVEYER BELT FOR CARTRIDGE BELTING MACHINES
Filed Oct. 3, 1949     2 SHEETS—SHEET 2
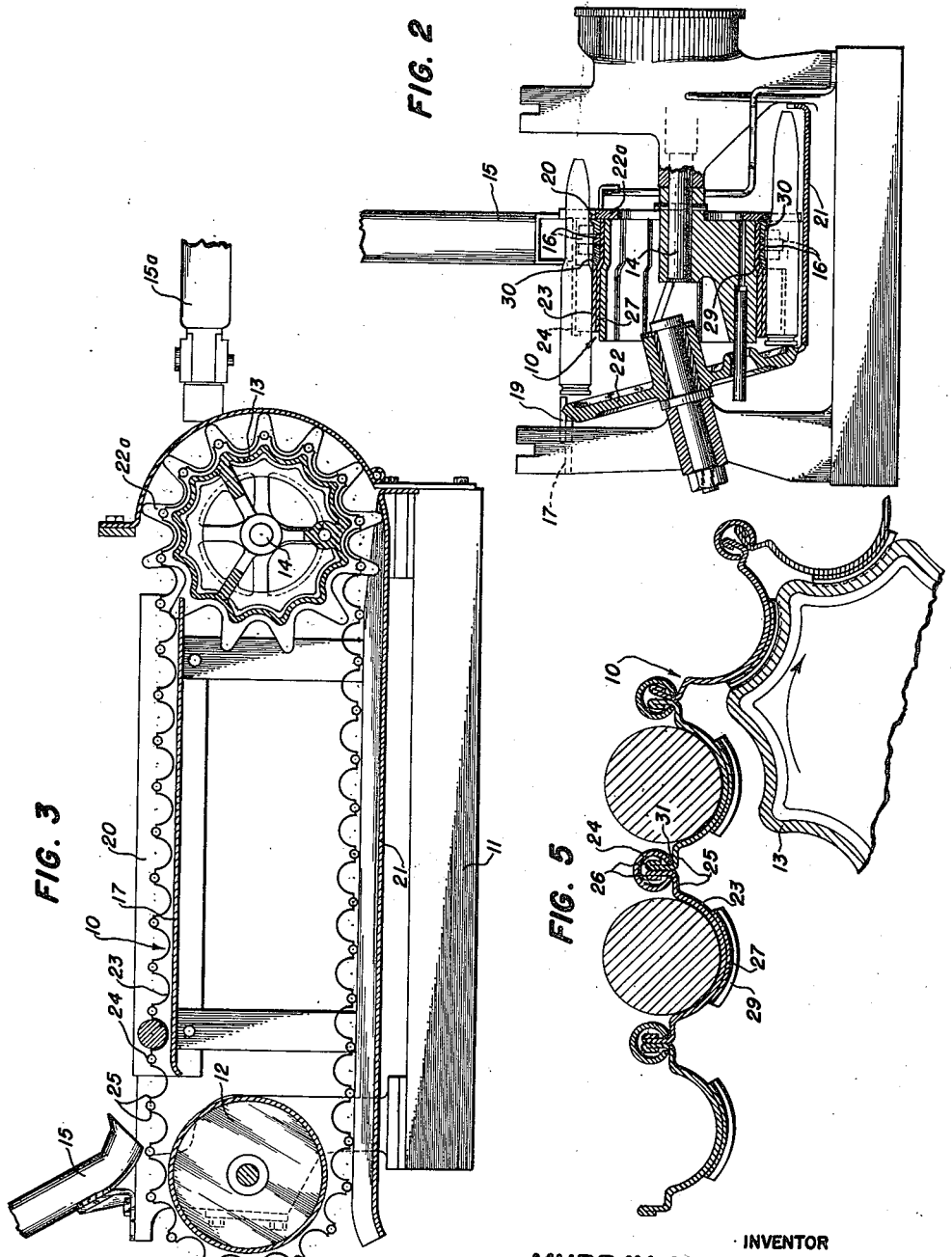
INVENTOR
MURRAY V. CHURCHILL
BY
ATTORNEYS Patented Nov. 25, 1952

2,619,000

UNITED STATES PATENT OFFICE 2,619,000

CONVEYER BELT FOR CARTRIDGE BELTING MACHINES

Murray V. Churchill, Alexandria, Va.

Application October 3, 1949, Serial No. 119,361

4 Claims. (Cl. 86—48)

(Granted under the act of March 3, 1883, as amended April 30, 1928; 370 O. G. 757)

This invention relates to improvements in machines for assembling cartridges in disintegrable belt formation, it being directed particularly to the conveyors of such machines which, in the past, have suffered cracking because of the presence of rivets, stapling or stitching necessitated by the current mode of construction.

An example of a machine embodying the latter mode of construction is illustrated in the United States patent to A. C. McCord et al. for Cartridge Clip Loading Machine, dated March 14, 1944, No. 2,344,443. One of the elements of that machine is a conveyor belt consisting of a thin strip of flexible, resilient metal which is pre-formed into an endless succession of recesses or open troughs for the cartridges and links. This belt is reinforced by a thin strip of resilient material, and the two are joined by the stapling or stitching mentioned.

In using machines of this type, cracks were found to develop in the belt components where the metal was weakened by the fastening means. Furthermore, the peaks between the troughs are also vulnerable to cracking, due to the constant flexure which takes place at the peaks as the belt assembly goes around the end wheels. With a view to overcoming the foregoing disadvantages, it is an object of the invention to provide a conveyor belt for a cartridge clip loading machine which consists of individual troughs for the ammunition and links, there being hinge couplings between the troughs where the integral peaks are in the machine above, providing an articulated conveyor which is not subject to cracking and eventual breaking.

Another object of the invention is to provide an articulated conveyor belt wherein the hinge couplings are made to insure free relative swinging of the troughs to the extent required and at the same time delineate spaces for the teeth of the sprocket at one end of the belt course.

Other objects and many of the attendant advantages of this invention will be readily appreciated as the same becomes better understood by reference to the following detailed description when considered in connection with the accompanying drawings wherein:

Fig. 1 is a plan view of a cartridge belting machine, enough of the known structure being shown to illustrate the relationship of the improved conveyor belt;

Fig. 2 is a cross section taken substantially on the line 2—2 of Fig. 1;

Fig. 3 is a longitudinal section taken substantially on the line 3—3 of Fig. 1;

Fig. 4 is a perspective view of a portion of the improved conveyor belt, several cartridge belt-links and a cartridge being shown in place;

Fig. 5 is a detail and enlarged cross section of the conveyor belt, two cartridges being shown in place;

Fig. 6 is a perspective view of a pair of the conveyor belt troughs, the connecting coupling being omitted; and Fig. 7 is a perspective view of the connecting coupling.

The immediately following description is that of a known cartridge belting machine in which the improved conveyor belt 10 is intended to be used. The essential details of that machine, as far as the invention is concerned, consists of a base 11 on opposite ends of which an idler wheel 12 and a drive wheel 13 are journaled. The conveyor belt 10 is an endless, articulated belt formation that takes over those wheels, and when the shaft 14 on which the wheel 13 is fastened is turned by means of the handcrank 15a the conveyor is set in motion.

This machine is required to be serviced by several operators. One of these stands next to a chute 15 down which the loosely assembled cartridge links 16 gravitate. It is his duty to see to it that there is a constant supply of links, and when one chute becomes empty he will replace it with a fully loaded chute. Another one of the operators stands beside the top guide tray 17, and it is his duty to feed the cartridges by hand directly to the troughs of the conveyor belt that traverses the tray and to the links carried by parts of the conveyor.

In emplacing the cartridges the second operator will use the rear bar 18 as a guide for their bases. This bar merges, so to speak, into a front cam bar 19. The inwardly angled face of the bar 19 exercises a cam action on the cartridges, pushing them partially into the links. The line of travel of the links is kept true by what is known as the top tray guide angle 20. This angle also acts as a stop for the links during the pushing of the cartridges when they reach the front cam bar guide 19.

The drive wheel 13 at the front of the machine where another and principal operator stands to turn the crank 15a, is peripherally scalloped to provide pockets for the loaded troughs as the conveyor belt moves over and under into the lower guide tray 21 at the rear end of which the finished cartridge belt emerges. This belt is produced by the action of a pusher wheel 22 which turns on a tilted axis. As the cartridge bases leave the cam bar 19 they come into engagement with the top rim of the pusher wheel. The angle at which this wheel is set is such that the cartridges are pushed fully into place in the links as they ride against the backing sprocket 22a (Fig. 2) in the half-turn from the top to the bottom flight of the conveyor.

Attention is now directed to the conveyor belt 10 which is the invention herein. It consists of a plurality of identical, metal troughs 23 and identical, metal slotted tubes 24 to provide the connecting couplings. Each trough is slightly less than a one-half circle in cross section (Fig. 5), and at opposite sides it has level flanges 25. These flanges have parallel, upstanding crimped rims 26 which become mutual abutments in the conveyor assembly. A piece 27, spot-welded at 28 to the underside of the trough, has an extension beyond one end of the trough to provide a link tray (Fig. 4).

The link tray is offset at 29 for the respective purposes of deepening the trough where the link 16 lies and to form a shoulder against which one of two lugs 30 on the link is adapted to rest. The other lug rides the side of the guide angle 20 for the previously stated purpose.

When two of the rims 26 are brought together as in Fig. 6 the troughs are coupled by slipping a tube 24 into place. The slot 31 (Fig. 7) is a little wider than the double thickness of metal that occupies it but too narrow for the crimps to go through. The emplacement of the tube is limited by the closed end 32 of the slot, and when a plug 33 is sealed in place in the other end the hinge connection is made complete. The closure of the slot at one end and the plug closure at the other end constitute self-retention means for the tube, since said elements abut the ends of the rims 26 to prevent slipping off of the tube in either direction.

Briefly describing the operation, the links 16 gravitate from the chute onto the conveyor where the individuals are distributed along the trays 27 in loosely coupled relationship (Fig. 4). One cartridge is shown there to illustrate how it appears when first laid in place. As the conveyor belt advances along the top bed of the machine, the cartridge bases which ride the side of the bar guide 18 eventually reach the cam bar 19 which imparts the initial push. In going around the drive wheel 13 the cartridges are pushed into the links all the way, and the finished cartridge belt is delivered at the rear outlet of the lower guide tray 21.

From Fig. 5 it will be understood that the conveyor belt 10 is substantially rigid in one direction of possible flexure but is quite free to flex in the other direction. That occurs as the conveyor goes around the drive wheel 13. The rims 26 then swing against each other and against the edges of the slots 31 like a hinge. The troughs 23 occupy the scallops of the drive wheel, and the driving is done by the teeth of the wheel against the troughs in the spaces between the troughs.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. An articulated conveyor belt consisting of a plurality of open troughs of rigid material having flanges on a common level at opposite sides, rims upstanding from the flanges to serve as mutual abutments, tubes emplaced on the rims to form couplings, said tubes having slots a little wider than the abutting rims to provide for a hinge action, and crimps on the rims located inside of the tubes to prevent the rims from escaping at the slots.

2. An articulated conveyor belt for cartridge belting machines, said conveyor consisting of a plurality of open troughs of rigid material to contain the cartridges, trays extending from the troughs at one side of the conveyor belt, said trays being offset from the troughs to form shoulders against which portions of links adapted to be contained by the trays are adapted to rest, and couplings loosely connecting the troughs for free flexure of the conveyor in one direction.

3. An articulated conveyor belt consisting of a plurality of adjoining links of rigid material each comprising an open trough spaced between two outwardly extended side flanges, elongated rims upstanding from the flanges to serve as mutual abutments, and couplings engaging adjoining links adjacent the rim-flange junctions to provide a pivot permitting free flexure of the conveyor in one direction and in conjunction with the abutting rims preventing conveyor flexure in the other direction.

4. In the device of claim 3 said couplings comprising partially slotted tubes having one open end enclosing three sides of the abutting rims, and quick detachable means associated with said tube open end for self-retention on the rims.

MURRAY V. CHURCHILL.

REFERENCES CITED

The following references are of record in the file of this patent:

UNITED STATES PATENTS

| Number | Name | Date |
| --- | --- | --- |
| 1,224,993 | Anderson | May 8, 1917 |
| 2,344,443 | McCord et al. | Mar. 14, 1944 |
| 2,432,398 | Edson | Dec. 9, 1947 |

FOREIGN PATENTS

| Number | Country | Date |
| --- | --- | --- |
| 29,057 | Austria | July 10, 1907 |